United States Patent [19]

Nishihara

[11] 4,336,819
[45] Jun. 29, 1982

[54] PNEUMATIC CONVERTER

[75] Inventor: Tadashi Nishihara, Tokyo, Japan

[73] Assignee: Yokogawa Electric Works, Ltd., Tokyo, Japan

[21] Appl. No.: 100,728

[22] Filed: Dec. 6, 1979

[51] Int. Cl.³ .......................................... G05D 16/00
[52] U.S. Cl. ...................................... 137/85; 137/84; 137/82; 92/34; 73/729
[58] Field of Search ................. 92/44, 34; 137/84, 85, 137/82; 73/700, 729

[56] References Cited

U.S. PATENT DOCUMENTS

| 1,764,193 | 6/1930 | Bruehl | 92/34 X |
| 2,927,593 | 3/1960 | Hall | 137/85 |
| 3,113,582 | 12/1963 | Hudson | 137/85 X |
| 3,390,694 | 7/1968 | Rouvalis | 137/85 |
| 3,507,191 | 4/1970 | Shelter | 92/34 |
| 3,645,293 | 2/1972 | Pedersen | 137/82 |

Primary Examiner—Alan Cohan
Attorney, Agent, or Firm—Parmelee, Bollinger & Bramblett

[57] ABSTRACT

A pneumatic converter comprising a bellows having in its interior a coupling plate connecting the two ends of the bellows together at a position offset from the center axis of the bellows.

8 Claims, 17 Drawing Figures

FIG. 8(A)   FIG. 8(B)   FIG. 8(C)
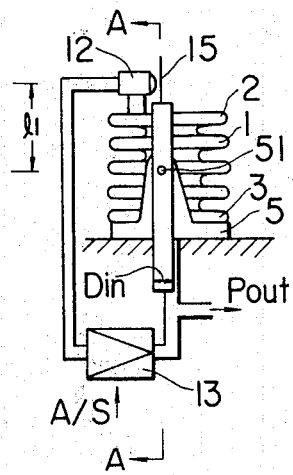 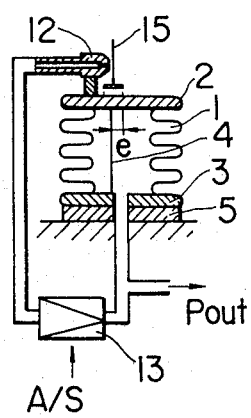 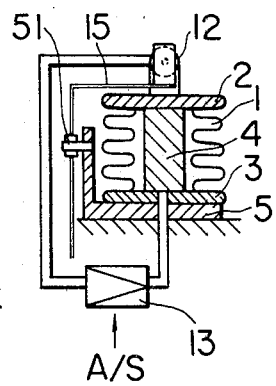
FIG. 9
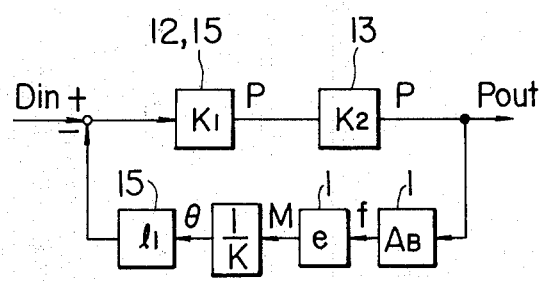
FIG. 10
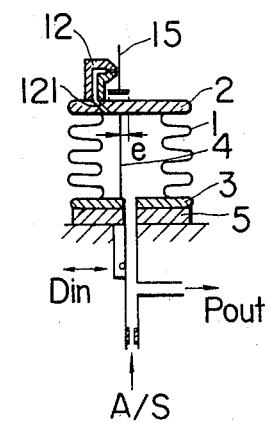

4,336,819

PNEUMATIC CONVERTER

BACKGROUND OF THE INVENTION

1. Field of the Invention

This invention relates to pneumatic converters for converting a pressure signal to a proportional force or displacement signal, or vice versa. More particularly, this invention relates to an improved means for effecting signal conversion by the use of a bellows.

2. Description of the Prior Art

In general, when a pressure is applied to the interior of a bellows, the free end develops a proportional force or displacement. Correspondingly, a force or a displacement may be converted to a pressure by the use of a bellows and a nozzle-flapper mechanism. A pneumatic converter according to the present invention is of such a type.

One of the known prior art converters in general use heretofore for conversion of a pressure to an angular displacement is illustrated in FIG. 1, in which (A) is a front view and (B) is a side view. This unit comprises an L-shaped base S supporting a bellows T fixed at one end thereof to the base. A plate U is rotatably supported on the base by means of a shaft V. The free end of the bellows is maintained in contact with the middle portion of the movable plate U, and a coil spring W is fixed at one end to the base and at its other end is connected to the plate U. The plate carries a pointer X held in place by means of screws Y.

Since the free end Z of the bellows T is bendable through 360 degrees, it becomes necessary for controlling the direction of motion of the pointer X to provide a linear support fulcrum having, for example, a length l as illustrated. Moreover, a base mechanism is needed to secure the bellows T, the coil spring W and so forth, thereby complicating the structure and causing it to be relatively large in size. Consequently, it has been desired to provide an improved bellows unit which is simpler in construction and smaller in size.

SUMMARY OF THE INVENTION

In accordance with a principal aspect of the present invention, there is provided an improved pneumatic converter comprising a bellows unit incorporating a coupling plate in the interior of the bellows coupling the two ends thereof together. This coupling plate is at a position offset from the center axis of the bellows. Other aspects of the invention will in part be pointed out in, and in part apparent from, the following detailed description considered together with the accompanying drawings.

BRIEF DESCRIPTION OF THE DRAWINGS

FIGS. 8(A), 8(B) and 8(C) are schematic and cross-sectional views showing the invention as used in a displacement-to-pressure converter, wherein FIG. 8(A) is a front view, 8(B) is a vertical sectional view, and 8(C) is a sectional view taken along the line A—A in 8(A);

FIG. 9 is a block diagram showing the functioning of the instrument of FIG. 8;

FIG. 10 is a schematic cross-sectional view showing the invention used in a displacement-to-force converter;

DESCRIPTION OF THE PREFERRED EMBODIMENTS

Figure 1A:
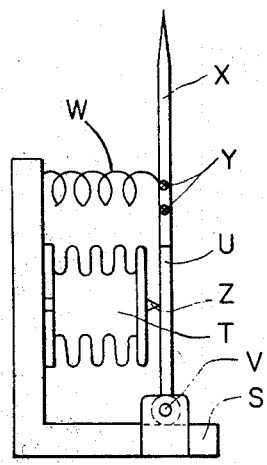
FIG. 1(A) and 1(B) illustrate the structure of a conventional prior art bellows unit.
Figure 1B:
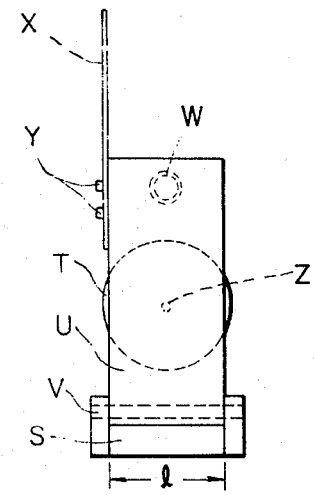
Figure 2:
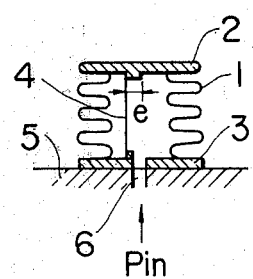
FIG. 2 is a cross-sectional view showing the structure of one embodiment of the present invention.

Referring now to FIG. 2, there is shown an embodiment of this invention comprising a bellows 1 into which an input pressure is introduced, and having substantially disk-shaped bellows ends 2 and 3 which are secured to the top and bottom of the bellows 1 respectively. A coupling plate formed of an elastic material is disposed within the bellows at a position deviating slightly (by a distance e in this embodiment) from the center axis of the bellows, and is held in such a manner that one edge thereof is anchored to the bellows end 2 while the other edge thereof is anchored to the bellows end 3. A base 5 supports the bellows end 3 which is formed with an inlet hole 6 through which an input pressure $P_{in}$ is introduced into the bellows.

When an input pressure $P_{in}$ is introduced in the bellows 1, a force proportional to the effective area of the bellows is generated in the axial direction thereof tending to expand the bellows in the axial direction. However, since the bellows ends 2 and 3 are coupled to each other by the coupling plate 4 offset from the bellows axis, the bellows end 2 is caused to incline in the direction of the offset with respect to the axis. Thus, it is possible to obtain a pressure-to-displacement conversion by utilizing the angular displacement that results from such inclination.

In relation to the input pressure $P_{in}$, the inclination angle $\theta$ of the bellows is represented by the following equation:

$$\theta = (Ae/(Kf + KB)) \cdot P$$

in which p1 $\theta$ is the output inclination angle
  A is the effective area of bellows 1
  e is the offset from the bellows axis
  Kf is the rotational elastic constant of coupling plate 4
  Kb is the rotational elastic constant of bellows 1
  P is the input pressure Due to the provision of the coupling plate 4 in the bellows 1, the linear support fulcrum located outside of the bellows in the prior art construction is no longer needed, thereby permitting a reduction in the dimensions. Moreover, the usual coil spring can be eliminated as well since the coupling plate serves also as a spring, hence rendering unnecessary a complicated base structure to support the bellows, the coil spring and the external fulcrum mechanism. Furthermore, because of the advantage that the support fulcrum can be located at an inner position beyond the diameter of the bellows, the leverage can be increased with facility. The entire construction is simplified since no external element exists, with the coupling plate 4 alone provided in the bellows 1.

Figure 3:
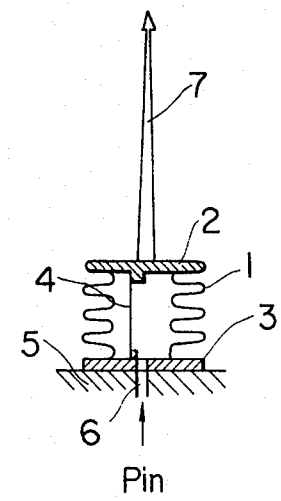
FIGS. 3 through 5 respectively are cross-sectional views showing converters of this invention employed as pressure indicators.

FIG. 3 shows an embodiment where the converter of this invention is employed in a pressure indicator, in which a pointer 7 is attached directly to a bellows end 2. The pressure indicator consists merely of a bellows, an internal coupling plate and a pointer, thereby simplifying the structure to an extreme degree, and achieving a reduction in the production cost. Since there is no friction component, high operating stability is attainable. In the pressure indicator of such a structure, the rigidity is great in the longitudinal direction of the coupling plate so that the motion is effected only in the direction of thickness thereof.

Figure 4:
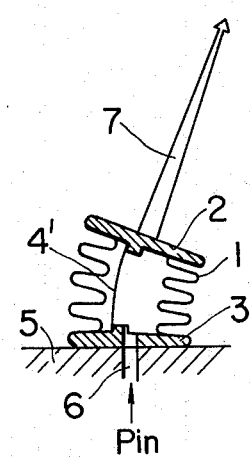

FIG. 4 shows another example where the invention is employed in a pressure indicator. In this embodiment, the coupling plate 4' is slightly longer than the bellows 1, which is thereby inclined as illustrated when the input pressure P is zero. With an increase of the input pressure, the bellows 1 is inclined in the opposite direction, past its upright position. In this structure, both a plus (tensile) region and a minus (contractile) region are usable out of the allowable stress regions of the coupling plate 4' and the bellows 1, so that the maximum deflection angle attainable is approximately doubled as compared with the example of FIG. 3.

Figure 5:
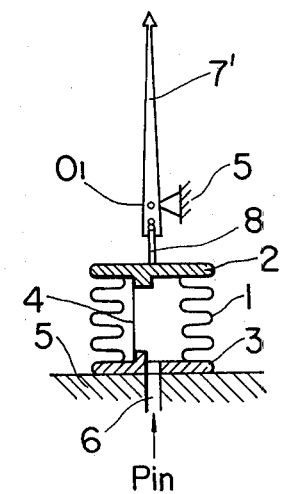

FIG. 5 shows another example where the invention is employed in a pressure indicator. Here the pointer 7' includes one portion near the rear end thereof supported on a base 5 at a rotational fulcrum $0_1$. One end of a drive shaft 8 is secured to a bellows end 2, while the other end thereof is engaged with the rear end of the pointer 7' in a disengageable manner. This embodiment is advantageous in that, as the long pointer and the block-shaped bellows are constituted of separate members, a convenience is attained with respect to storage and so forth prior to assembly. In the case of breakage or the like, the pointer or the bellows are replaceable independently. Moreover, the design facilitates adjustment of parameters such as span and linearity.

Figure 6:
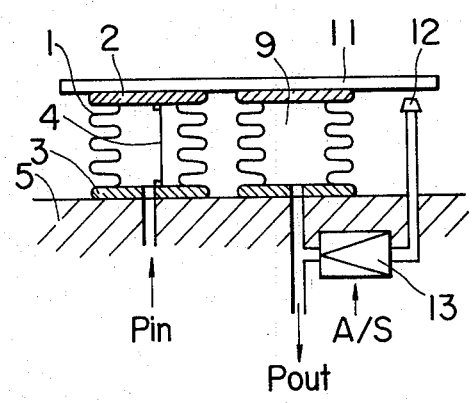
FIG. 6 is a cross-sectional view showing a converter of this invention employed in a force-balance type of feedback instrument.

FIG. 6 shows an embodiment where the invention is employed in a force-balance type of instrument including a feedback bellows 9 arranged to press against a rigid beam 11. Slight movement of the beam is detected by a nozzle 12 the back pressure of which is directed to a conventional pneumatic pressure amplifier 13 supplying its output pressure to the feedback bellows 9. The stationary ends of the input bellows 1 and the feedback bellows 9 are secured to the base 5, while the free ends of these bellows are maintained in contact with the rigid beam 11.

The nozzle 12 is arranged to constitute a nozzle-flapper mechanism, in which a portion of the rigid beam 11 functions as the flapper. The pneumatic pressure amplifier 13 serves to amplify the back pressure of the nozzle 12, and the amplifier output is fed to the feedback bellows 9 to maintain the beam in balance. The amplifier output also is transmitted as an output pressure $P_{out}$.

In the conventional device used in general heretofore, an input bellows and a feedback bellows are disposed at the two sides of a support fulcrum in the midsection of a rigid beam. Therefore, the input bellows and the feedback bellows cannot be positioned close to each other, due to the presence of the support fulcrum, so that it is not readily possible to reduce the dimensions of the instrument. Moreover, the necessity for the mechanical components for the support fulcrum is another disadvantage of the conventional arrangement. However, in the example of FIG. 6, the fulcrum is located in the input bellows 1, and the function of the fulcrum mechanism is performed entirely by the coupling plate 4 alone, so that the construction is simplified to permit smaller dimensions and lower production cost.

Figure 7:
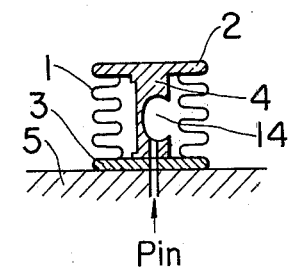
FIG. 7 is a cross-sectional view illustrating the structure of another embodiment of the present invention.

FIG. 7 illustrates the structure of another embodiment according to the present invention, wherein a bellows end 2 and a relatively thick coupling plate 4 are integrated with each other, and a recess 14 is formed in the plate portion to provide flexibility of the plate. This arrangement assures the elimination of any hysteresis error, temperature error or linearity error that may occur as a result of non-integration at the region of joinder of the coupling plate 4, e.g. due to the unevenness of stresses when the two edges of the coupling plate 4 are secured to bellows ends 2 and 3 by welding or the like.

FIG. 8 shows an embodiment where the invention is used as a displacement-to-pressure converter, in which FIG. 8(A) is a front view, 8(B) is a vertical sectional view, and 8(C) is a sectional view taken along the line A—A in 8(A). A nozzle 12 is secured to the bellows end 2, and a flapper 15 is mounted on a shaft 51 supported by the base 5. One end of the flapper is positioned opposite to the nozzle 12 to constitute a nozzle-flapper mechanism, while the other end thereof receives an input displacement $D_{in}$ (an angular displacement). A pneumatic pressure amplifier 13 serves to amplify the back pressure of the nozzle 12 and generates an output which is fed to the bellows 1 and also is transmitted as an output pressure $P_{out}$.

In this embodiment, the functioning is as follows: Assuming that an input displacement is applied such as to reduce the gap between the flapper 15 and the nozzle 12, the back pressure of the nozzle 12 will increase. The corresponding increased pressure produced by the pneumatic pressure amplifier 13 is introduced into the bellows 1, where an increased force proportional to the effective area of the bellows 1 is generated in the axial direction thereof. Since the bellows ends 2 and 3 are coupled to each other by the coupling plate 4 offset from the center axis, the bellows end 2 is inclined in the direction of the offset with respect to the axis, thereby causing inclination of the nozzle 12 to tend to increase the gap between the nozzle 12 and the flapper 15. Thus the initial decrease in the nozzle-flapper gap is countered by a feedback action tending to increase the gap. Consequently, the nozzle-flapper gap is maintained in a balanced condition with the nozzle positioned in accordance with the input displacement. The back pressure of the nozzle 12 is amplified by the pneumatic pressure amplifier 13 which generates an output pressure $P_{out}$ proportional to the input displacement $D_{in}$.

FIG. 9 presents a block diagram illustrating the operation of FIG. 8. In this diagram, K1 is the gain of the nozzle-flapper mechanism, K2 is the gain of the pneumatic pressure amplifier 13, $A_B$ is the effective area of the bellows 1, e is the offset of the coupling plate 4, k is the total elastic constant (e.g. kg-mm/rad) of displacement converter, and $l_1$ is the distance from the support shaft 51 to the nozzle 12. In the instrument shown in FIG. 8, a movable plate and so forth as employed in the conventional device are no longer needed, and the nozzle 6 is attached directly to the bellows end 2 to achieve a compact construction.

FIG. 10 shows an embodiment where the invention is used in a displacement-to-pressure converter. In this instrument, a hole 121 is formed in the bellows end 2 so as to effect direct communication between a nozzle 12 and the bellows 1 with elimination of the pneumatic pressure amplifier 13 employed in the embodiment of FIG. 8. The air supply A/S is connected to the bellows through a restriction serving as a throttle. The FIG. 10 arrangement is adapted for use in the case where the load is relatively small; that is, when the output pneumatic pressure $P_{out}$ need not be amplified. In comparison with the embodiment of FIG. 8, this embodiment does not require the pneumatic pressure amplifier 13 and a pipe for connecting the nozzle 12 with the amplifier 13, hence rendering the converter less expensive and smaller.

It is desirable that the rotational center of the bellows 1 and the center of the support shaft 51 be substantially aligned with each other. However, an offset may be provided intentionally between the two centers in a manner to improve the overall linearity characteristics of the entire device, as by compensating the linearity error of the bellows.

Figure 11:
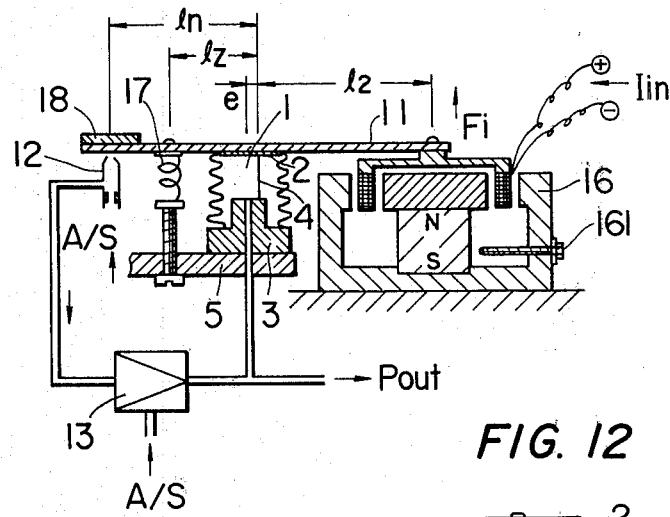
FIG. 11 is a schematic cross-sectional view showing the invention used in a current-to-pressure converter.
Figure 12:
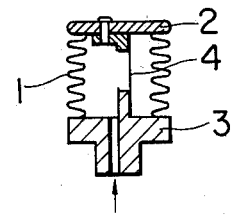
FIG. 12 is a detail cross-section illustrating the structure of principal components of the instrument of FIG. 11.
Figure 13:
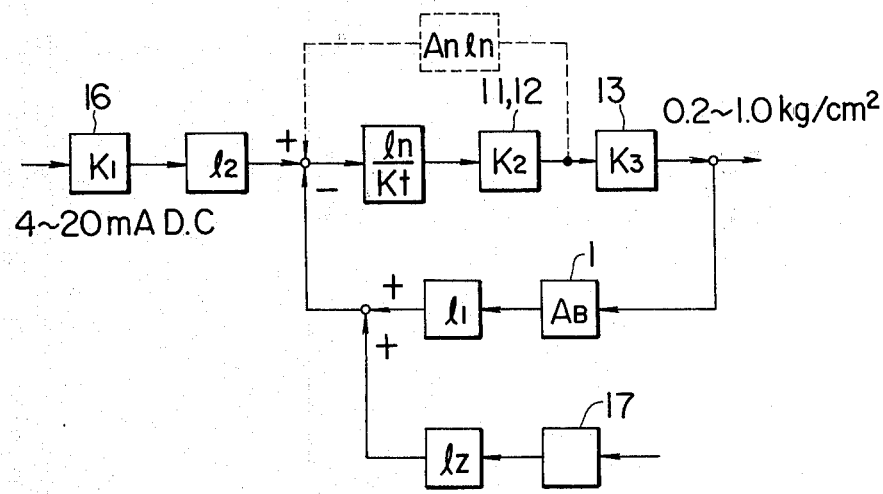
FIG. 13 is a block diagram illustrating the functioning of the instrument of FIG. 11.

FIG. 11 shows an embodiment where the invention is used in a current-to-pressure converter. FIG. 12 illustrates the detail structure of principal components in FIG. 11, and FIG. 13 is a block diagram illustrating the operation of the instrument of FIG. 11. The instrument includes a force motor 16 which is equipped with, in this example, a moving coil to convert a d-c current input $I_{in}$ (e.g. 4 to 20 mA) to a proportional force. A span adjustment screw 161 is inserted in the force motor 16. The force motor applies its output force to a rigid beam 11 connected thereto.

A bellows 1 also applies a force to the beam 11. This bellows incorporates an internal coupling plate 4 at a position slightly offset (by a distance e) from the center axis of the bellows, and serving to couple bellows ends 2 and 3 with each other. The free end of the bellows is connected to the middle portion of the rigid beam.

A nozzle 12 constitutes a nozzle-flapper mechanism in cooperation with a portion of the left-hand end of the beam 11. A pneumatic pressure amplifier 13 serves to amplify the back pressure of the nozzle 12 and generates an output which is fed to the bellows 1 while being transmitted as an output pressure $P_{out}$. A zero adjustment spring 17 is interposed between the beam 11 and a casing or the like, and a balance weight 18 is mounted on the beam.

FIG. 13 shows in block diagram form the operation of the instrument of FIG. 11. In this diagram, K1, K2 and K3 denote the transfer functions of force motor 16, nozzle-flapper mechanisms 11, 12 and pneumatic pressure amplifier 13; $A_B$ and An denote the effective areas of bellows 1 and nozzle 12; and e, $l_2$, $l_n$ and $l_z$ denote the distances from the coupling plate 4 to the centers of bellows 1, force motor 16, nozzle 12 and zero adjustment spring 17 respectively.

In the above structure, the operation is as follows: When an input current $I_{in}$ flows in the force motor 16 to generate an upward force Fi, the beam 11 is thereby rotated counterclockwise about the coupling plate 4 serving as a support point, so that the gap between the beam 11 and the nozzle 12 is decreased and the nozzle back pressure is increased. This back pressure change is amplified by the pneumatic pressure amplifier 13 and is transmitted as an output pressure $P_{out}$ while being fed to the bellows 1. In response to the applied pressure, bellows 1 applies a clockwise moment to the coupling plate 4 and balances the same against the moment produced by the force Fi. In this example, a substantial leverage is attainable due to employment of the bellows 1 containing the coupling plate 4 therein, since the support fulcrum can be located in the extreme proximity of the center axis of the bellows 1. Consequently, there is no necessity of employing any complicated means, such as a dual leverage mechanism or a vector lever. Thus the structure is rendered quite simple, thereby to permit small dimensions, low production cost and high accuracy.

According to experiments, the accuracy attained was ±0.1 percent in one mechanism with its leverage set to a ratio of 1:30.

Figure 14:
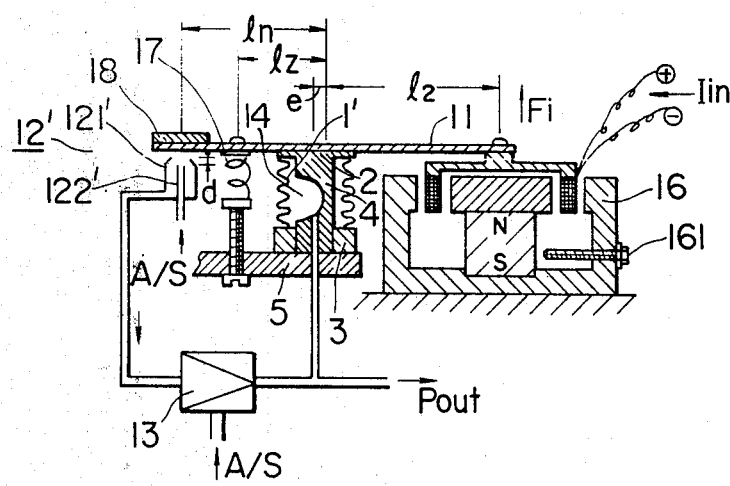
FIG. 14 is a schematic cross-sectional view showing another example of the invention used in a current-to-pressure converter.

FIG. 14 shows another embodiment where the invention is used in a current-to-pressure converter. Here the bellows end 2 and the coupling plate 4 are integrated with each other as illustrated, and a recess 14 is formed in the plate portion to furnish flexibility. This particularly makes it possible to prevent hysteresis error, temperature error or nonlinearity error that might otherwise occur due to non-integration at the region of joinder with the coupling plate 4, as a result of the unevenness of stresses when the two edges of the coupling plate 4 are secured to bellows ends 2 and 3 by welding or the like. This can be of real importance because in many applications such errors cause serious problems, particularly when the structure is of small size and the signal transferred in the converter is small in magnitude.

A double-tube nozzle 12' is employed in the FIG. 14 embodiment to increase the loop gain. In the ordinary nozzle utilized generally, a high loop gain is not obtainable since a negative feedback occurs because of the nozzle injection force, as shown by a dotted line in FIG. 13. In the FIG. 14 embodiment, however, such a problem is solved by using the double-tube nozzle 12' in which an inner tube 122' is disposed at a position slightly lower than an outer tube 121' by a distance d.

Although several specific embodiments of the present invention have been described hereinabove in detail, it is desired to emphasize that such descriptive material has been presented for the purpose of teaching the concepts and advantages of the invention, and should not be treated as necessarily limiting of the invention since it is clear that many variants and modifications of the invention can be devised by those skilled in the art to meet the requirements of quite different applications.

I claim:

1. A pneumatic instrument for use in instrumentation systems for developing an output force or displacement proportional to an input fluid pressure, said instrument comprising:

a bellows having an end plate movable in response to changes in the bellows internal pressure;

an output member for said instrument located outside of said bellows and connected to an external portion of said end plate for movement therewith; and a coupling plate in said bellows extending between the two ends thereof and serving to couple said end plate directly to the other end of said bellows, said coupling plate being incompressible longitudinally and having at least a portion thereof which is transversely bendable, said coupling plate being offset from the center axis of said bellows to provide for tilting movement of said end plate, and corresponding movement of said output member, with changes in the bellows pressure.

2. A pneumatic converter as set forth in claim 1, wherein said other end of said bellows is supported on a base, said end plate of said bellows being free and developing a force or displacement proportional to an input fluid pressure applied to said bellows.

3. A pneumatic converter as set forth in claim 2, including a pointer having one end thereof anchored to the free end of said bellows.

4. A pneumatic converter as set forth in claim 1, wherein one of the ends of the bellows and the coupling plate are formed integrally.

5. A pneumatic converter as set forth in claim 1, further comprising a nozzle element and a flapper element disposed opposite to the nozzle element so as to constitute a nozzle-flapper mechanism, one of said elements being displaceable in accordance with an input displacement; the other of said elements being integral with said output member for movement towards or away from said one element in response to tilting movement of said end plate; an amplifier for amplifying the back pressure of the nozzle element; and means for transmitting the output of said amplifier as the output of the converter and as a feedback signal to the bellows.

6. A pneumatic converter as set forth in claim 1, further comprising a flapper displaceable in accordance with an input displacement; a nozzle located at a free end of the bellows and disposed opposite to the flapper; means for introducing the back pressure of the nozzle directly to the bellows; a fluid source supplying a fluid pressure to the bellows through a throttle; and output means comprising a branch passage between the throttle and the bellows.

7. A pneumatic converter as set forth in claim 1, further comprising a rigid beam a central portion of which serves as said output member of said bellows; a current conversion element for applying to one end of said rigid beam a force proportional to an input current; a nozzle constituting a nozzle-flapper mechanism in cooperation with a portion of the other end of the rigid beam; an amplifier for amplifying the back pressure of the nozzle; and means for transmitting the output of said amplifier to the output of the converter and to the bellows as a feedback signal.

8. A pneumatic converter as set forth in claim 7, wherein one of the two end members of the bellows coupling plate are integrated with each other.

* * * * *